J. R. COKER.
SELECTIVE AUTOMATIC TRAIN STOP SYSTEM.
APPLICATION FILED SEPT. 25, 1915.
1,289,397.
Patented Dec. 31, 1918.
10 SHEETS—SHEET 1.
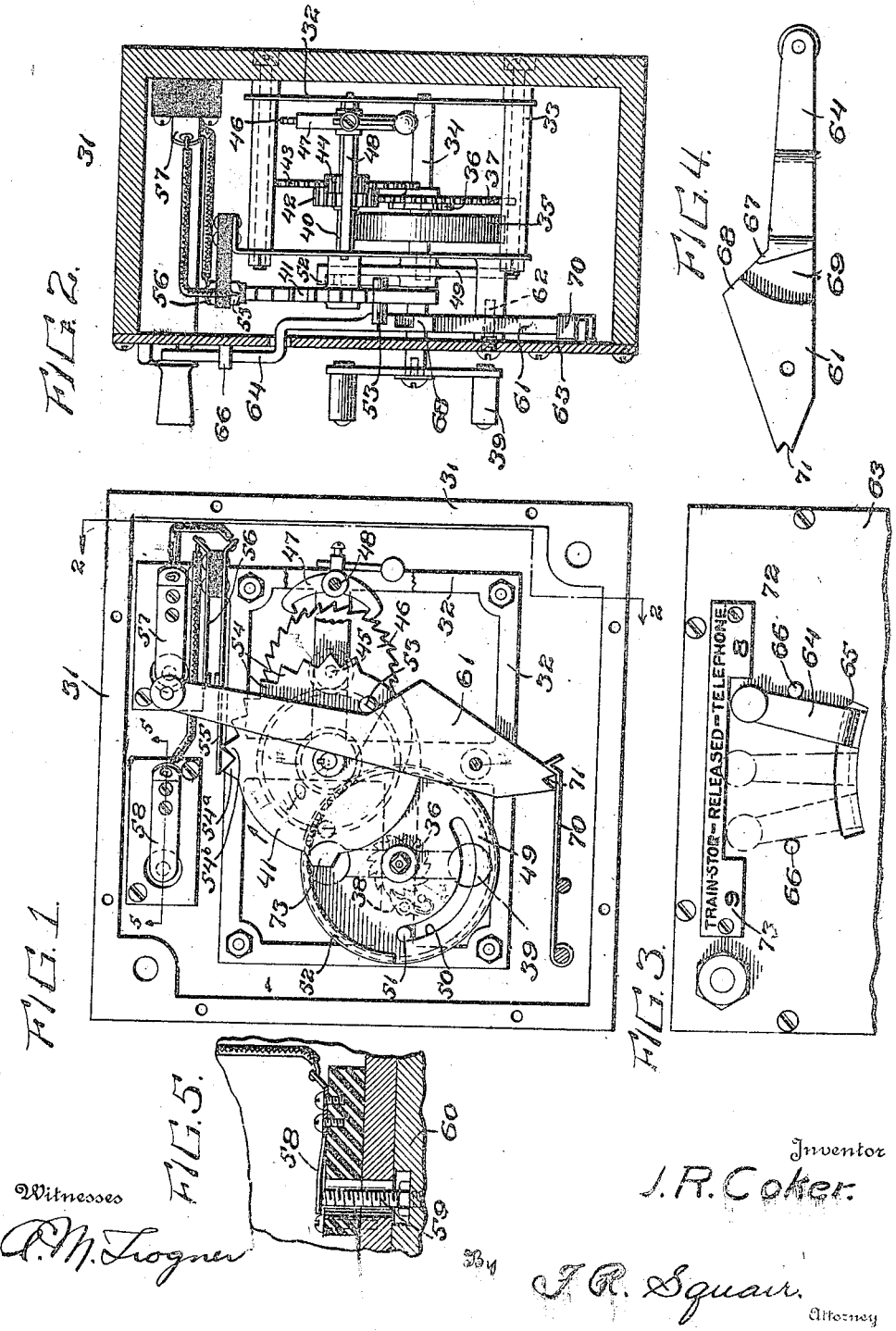
Witnesses
P. M. Trogner
Inventor
J. R. Coker.
By J. R. Squair.
Attorney

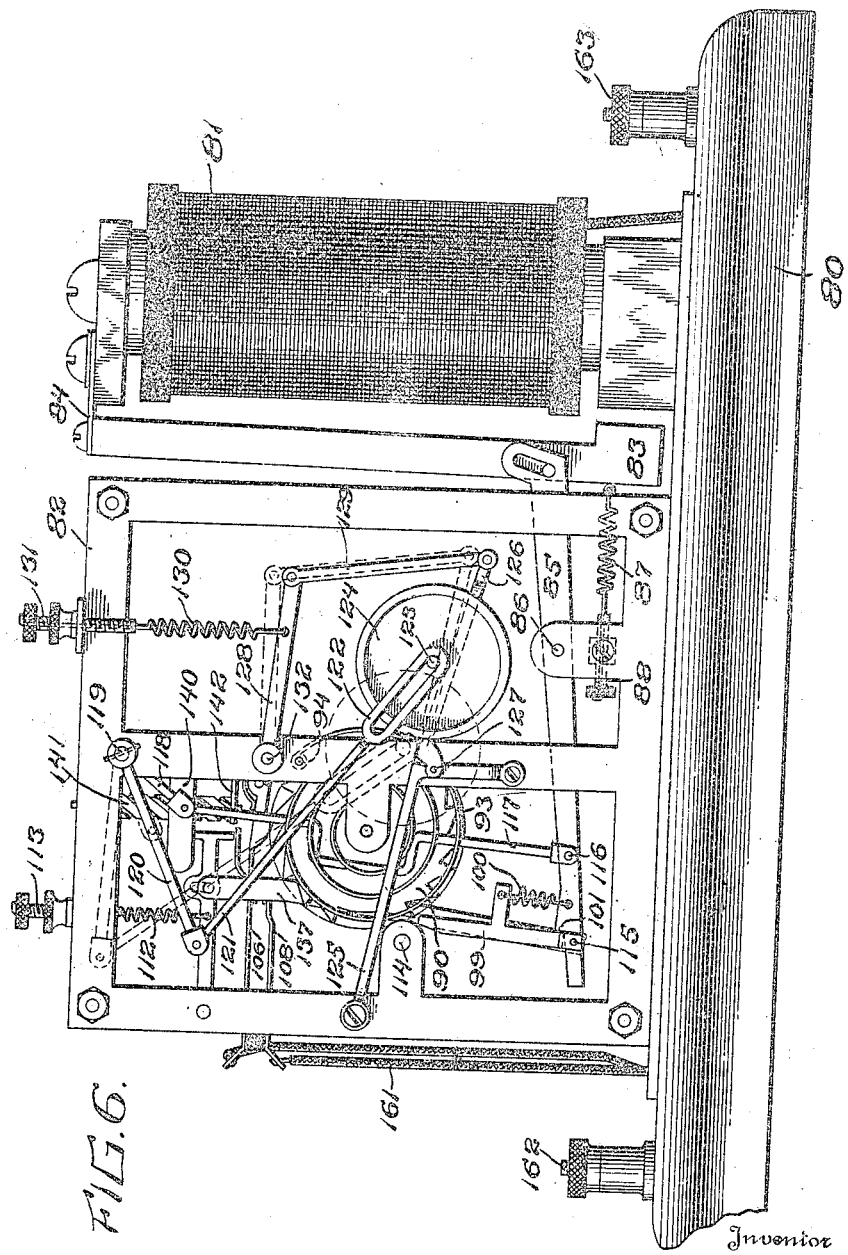

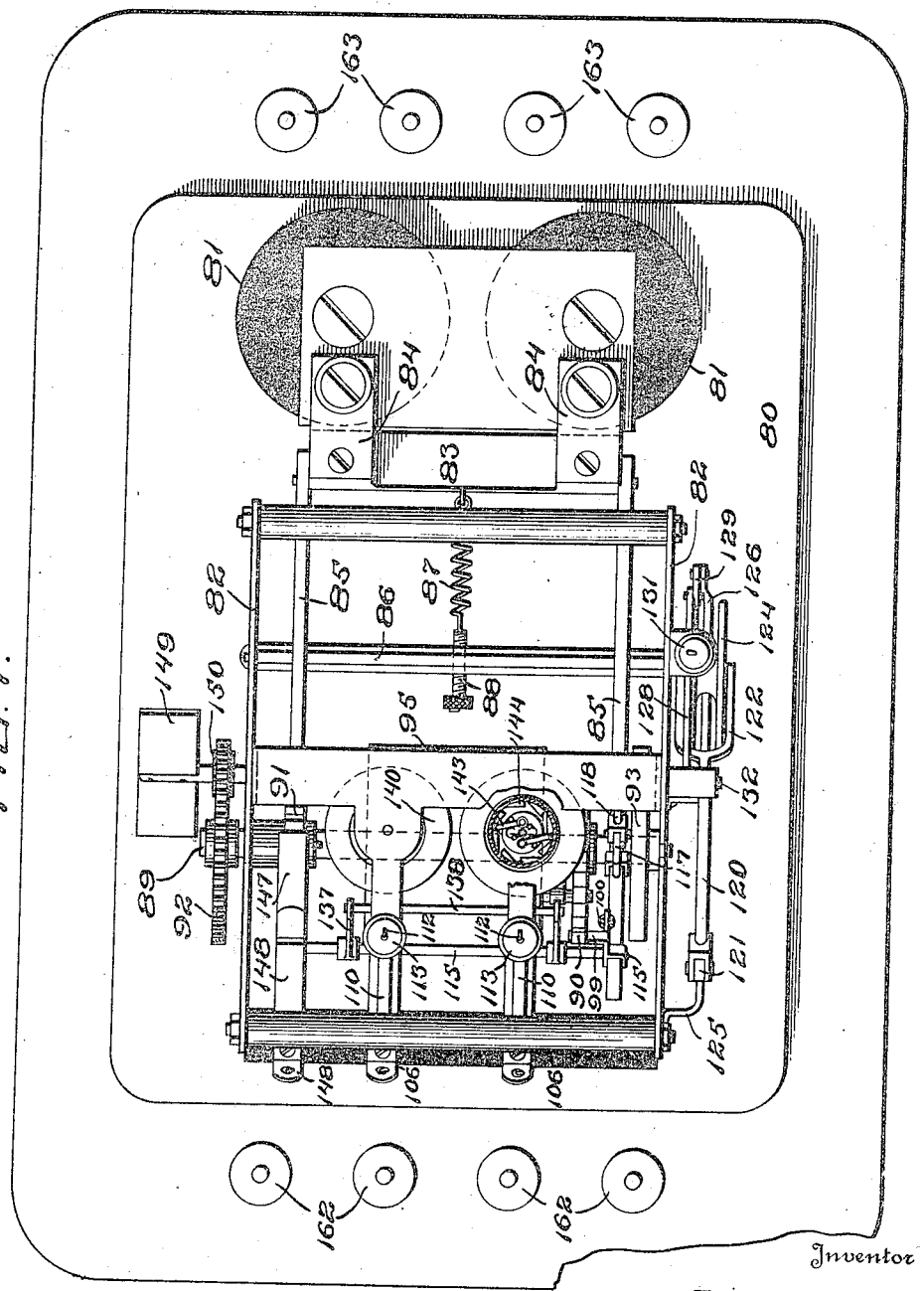

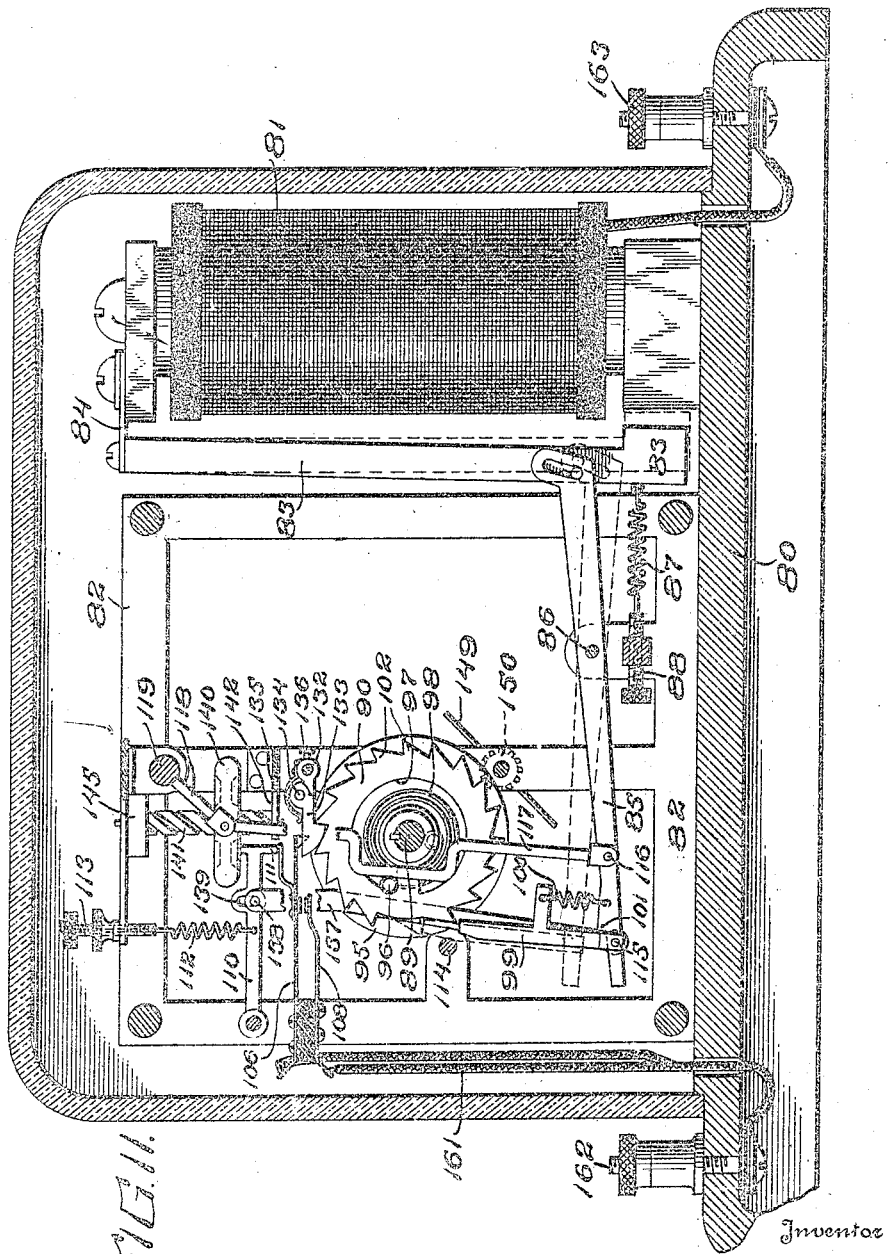

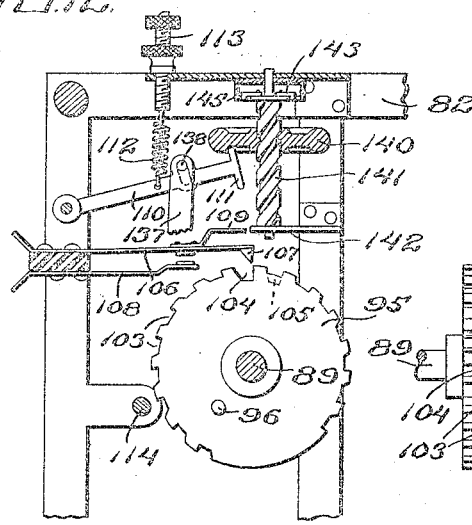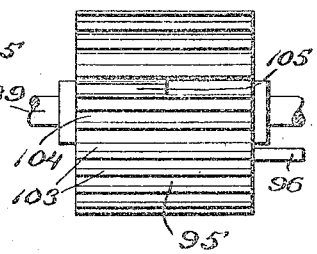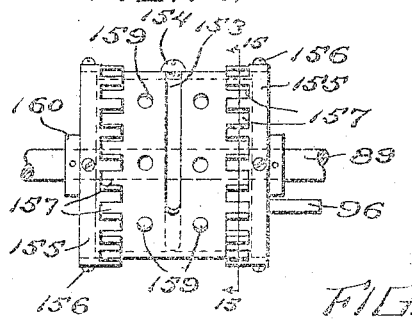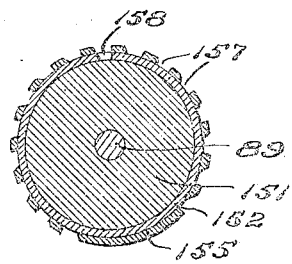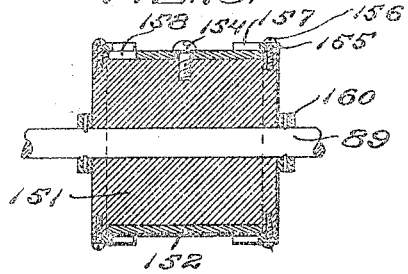

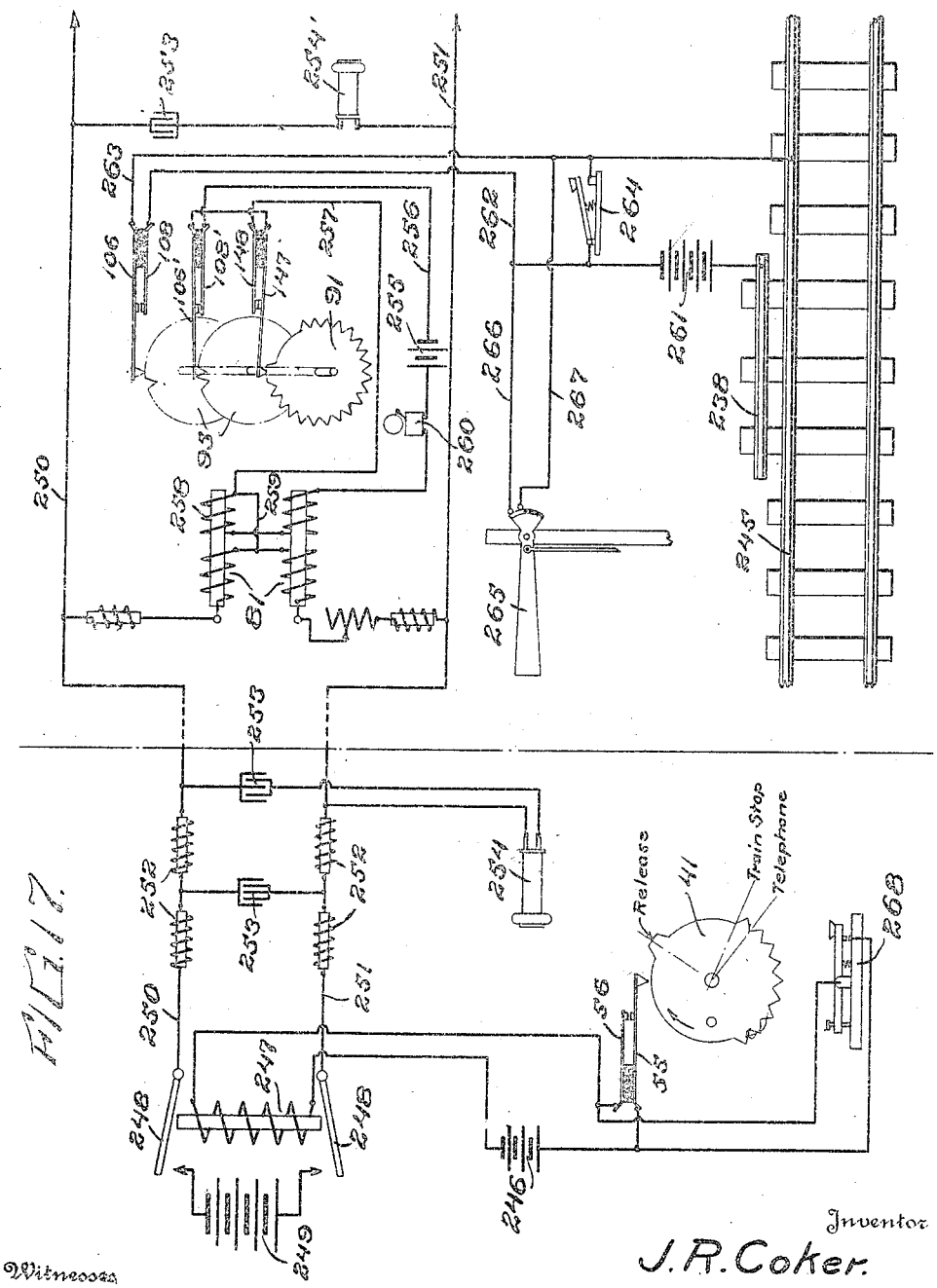

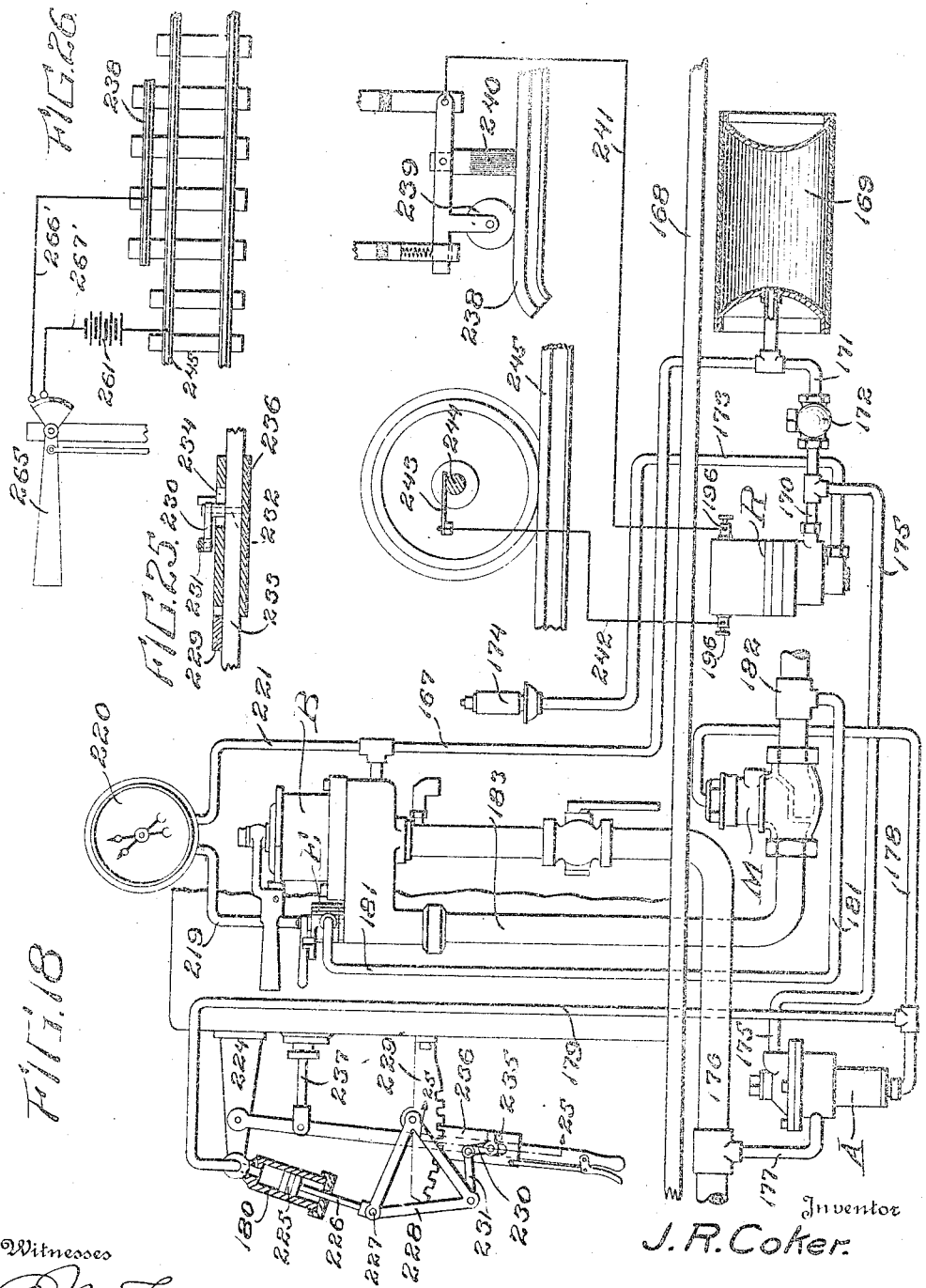

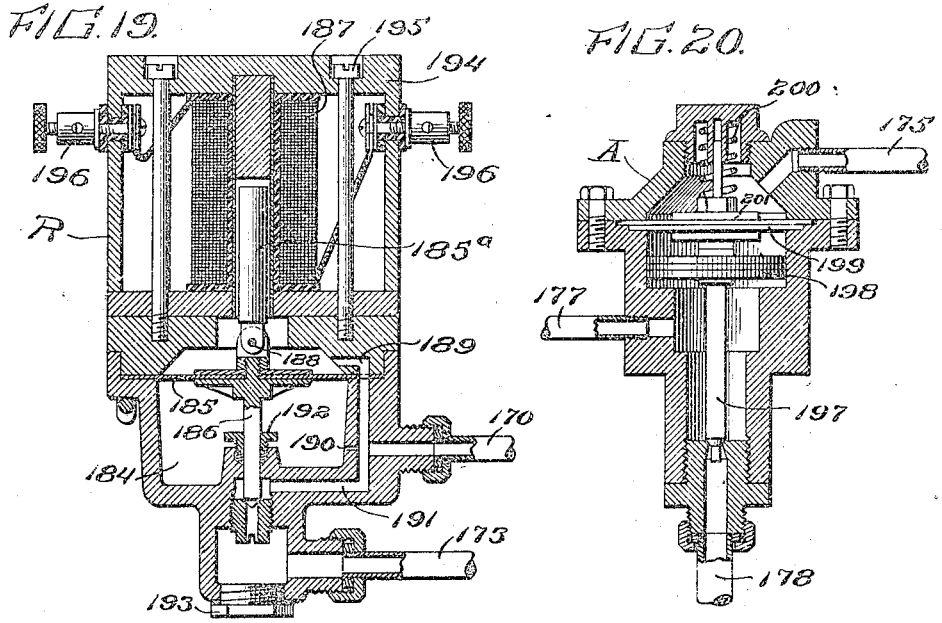
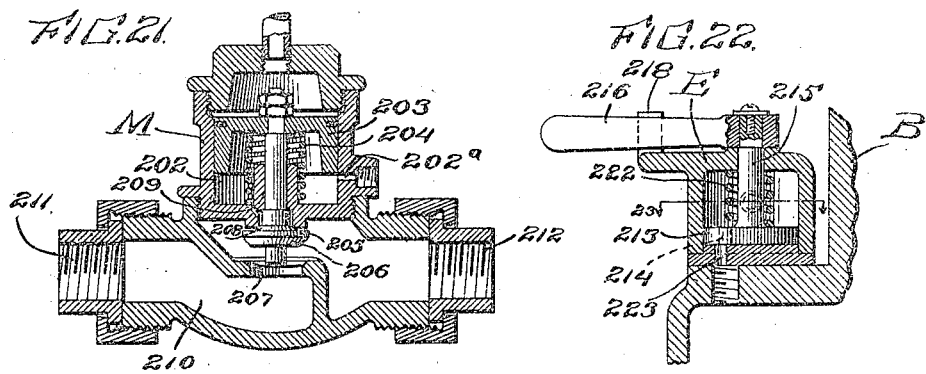
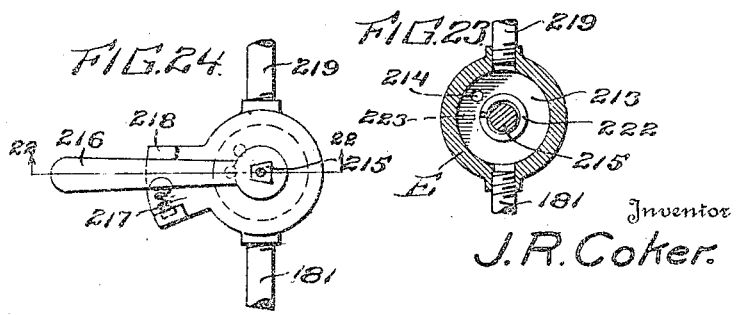

J. R. COKER.
SELECTIVE AUTOMATIC TRAIN STOP SYSTEM.
APPLICATION FILED SEPT. 25, 1915.

1,289,397.

Patented Dec. 31, 1918.
10 SHEETS—SHEET 10.

Inventor
J. R. Coker.

Witnesses

By
F. R. Squair.
Attorney

UNITED STATES PATENT OFFICE.

JAMES R. COKER, OF KNOXVILLE, TENNESSEE.

SELECTIVE AUTOMATIC TRAIN-STOP SYSTEM.

1,289,397.  Specification of Letters Patent.  Patented Dec. 31, 1918.

Application filed September 25, 1915. Serial No. 52,702.

*To all whom it may concern:*

Be it known that I, JAMES R. COKER, a citizen of the United States, residing at Knoxville, in the county of Knox and State of Tennessee, have invented certain new and useful Improvements in Selective Automatic Train-Stop Systems, of which the following is a specification.

This invention relates to a selective system for stopping trains and to certain novel devices employed in connection therewith, and comprises a combined selective signaling and automatic train-stop system.

One of the principal features of this invention pertains to a novel selector mechanism which may be substituted for the selectors now in common use on railways without changing or increasing in number the line wires used in the ordinary signaling systems, and which functions either as a telephone signal alone or as a combined telephone signal and train-stop mechanism, depending upon the character of the current impulses impressed thereon.

Another feature of this invention is a new selective sending device or calling key to be used in connection with the above double acting selector.

One of the objects of this invention is to provide on a train or other railway vehicle means which may be set in operation directly by the train despatcher at the sending station to stop the train and which will thereupon entirely supersede the engineer in the control of the train until it has been brought to a stop.

In the operation of trains it not infrequently happens that the train despatcher becomes aware that a collision or other accident is impending with respect to one or more trains along the line of road under his supervision. In such a case it becomes highly desirable, and in fact essential, that the despatcher be able to stop one or more of these trains without the delay necessitated by having to get into communication with a local station agent or the engineer on the train, either one of whom may be incapacitated and unable to respond. The present system is designed to enable the chief despatcher to directly control and bring to a stop any train in his division as it passes certain predetermined points along the line of road.

The system to which, among other things, this invention is directed comprises a plurality of way stations along a line of road connected by the ordinary line wires to a sending or despatcher's station, a selector at each of the way stations adapted when selectively operated to close a switch in one or more local circuits, and a train provided with an electrical and an air-brake equipment so constructed that when the train runs past a certain point in the vicinity of a way station whose selector has been operated the train circuit will close the local circuit and thereby cause the air-brake to operate independently of the engineer and bring the train to a stop by a full service application of the brakes. The train is also provided with means for automatically shutting off the motive power when it is desired to stop the train in this manner.

In this system in its preferred form my selector and sending device are designed to function ordinarily in the same way as the calling key and selector at present extensively used in telephone selective signaling systems, but they are also designed to enable the despatcher when the proper occasion arises to stop a train which is running near a certain station and at the same time to actuate the telephone signal at that station. In its preferred form this system also includes a local circuit which branches, the two branches leading to portions of the track somewhat widely separated with the station between them, so that where two trains are scheduled to pass through this station at about the same time on the same track as the result of a lap order, the train despatcher is enabled to stop both trains and thus prevent a collision.

In the accompanying drawings wherein a preferred embodiment of the invention is shown, Figure 1 is a front elevation of the calling or sending key, with cover removed and certain parts broken away;

Fig. 2 is a vertical section on the line 2—2 of Fig 1;

Fig. 3 is a partial front elevation of the calling key with cover in place;

Fig. 4 is a detail of the indicating arm;

Fig. 5 is a horizontal section on the line 5—5 of Fig. 1, viewed from below;

Fig. 6 is a side elevation of the selector;

Fig. 7 is a top plan view of the selector;

Fig. 11 is a vertical longitudinal section on the line 11—11 of Fig. 8;

Fig. 12 is a partial vertical longitudinal section on the line 12—12 of Fig. 8, showing the contact wheel and its time element;

Fig. 13 shows the contact wheel in front elevation;

Fig. 14 shows a modified form of contact wheel;

Fig. 15 is a vertical section on the line 15—15 of Fig. 14;

Fig. 16 is an axial section of the modified contact wheel shown in Fig. 14;

Fig 17 is a circuit diagram showing both the main and local circuits and the relative positions of the contact mechanisms in the calling key and selector when a telephone signal has been given;

Fig. 18 is a view, largely diagrammatic, of the valve and circuit connections on the locomotive, showing in detail the automatic throttle closing device;

Fig. 19 is a vertical longitudinal section through the center of the release valve;

Fig. 20 is a central vertical section through the valve which connects the brake-pipe with the throttle closing cylinder;

Fig. 21 is a central vertical section through the main reservoir valve;

Fig. 22 is a central vertical section through the engineer's emergency valve;

Fig. 23 is a horizontal section on the line 23—23 of Fig. 22;

Fig. 24 is a top plan view of the emergency valve;

Fig. 25 is a section on the line 25—25 of Fig. 18 showing in detail a part of the quadrant-latch release construction;

Fig. 26 is a diagrammatic view of a modification showing the manner of placing the local circuit in operative condition when the semaphore is raised to its danger position;

Figure 8:
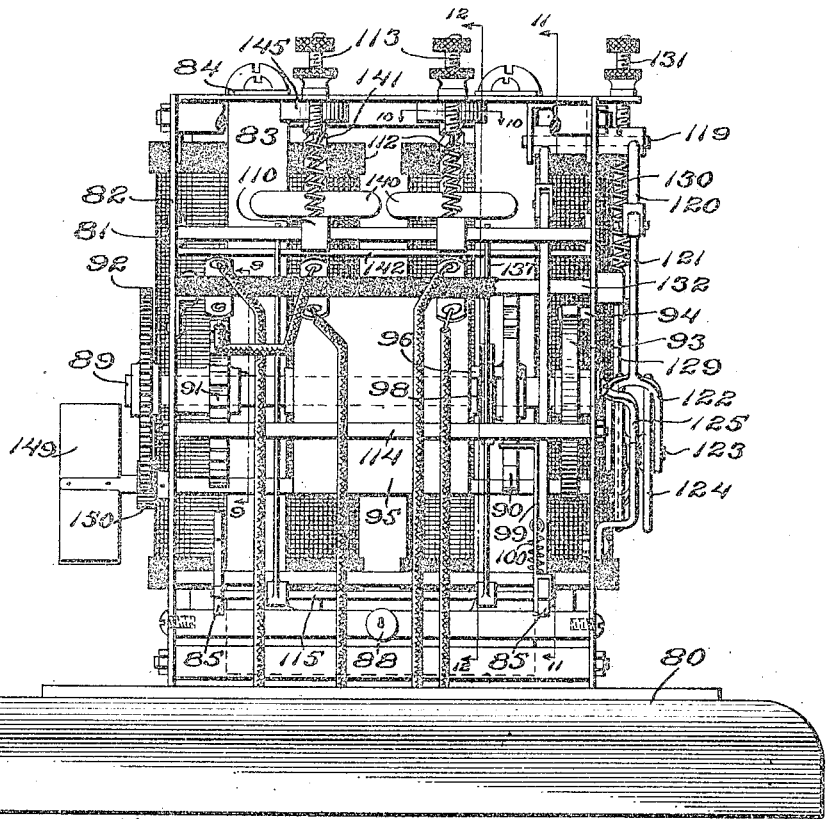
Fig. 8 is a front elevation of the selector with two of the frame members and the binding posts broken away.
Figure 9:
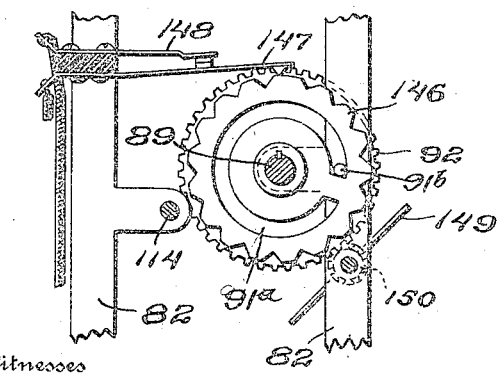
Fig. 9 is a vertical section on the line 9—9 of Fig. 8, showing in detail the selective answer-back mechanism.
Figure 10:
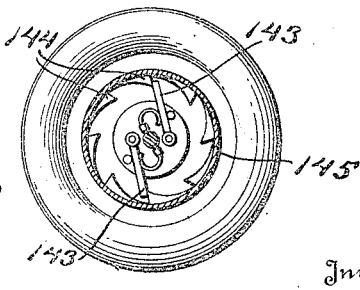
Fig. 10 is a horizontal section on line 10—10 of Fig. 8 showing in detail the pawl and ratchet arrangement on one of the upper time elements.

The sending device is shown in Figs. 1 to 5 and 27 to 30. The frame 31 supports an inner framework 32 on brackets 33. The inner framework 32 provides bearings for a shaft 34 on which is mounted a ratchet wheel 36. A spring 35 is fastened at one end to the shaft 34 and at the other end to the bracket 33. A pinion 37, loosely mounted on the shaft 34, carries a spring-pressed pawl 38 which engages with the ratchet 36. A handle 39 is fixed to one end of the shaft for winding up the spring.

A shaft 40 supported in the framework 32 has mounted thereon the contact wheel 41 and a pinion 42 which engages the pinion 37. A pinion 43 is also mounted on the shaft 40 and engages a pinion 44 mounted on a shaft 45 to which is fixed the escapement wheel 46; the escapement 47, oscillating from the shaft 48, engages the wheel 46.

On the shaft 34 is fastened the disk 49 which is provided with a slot 50 for a pin 51. A flange 52 extends part way around the periphery of the disk 49 and is so positioned as to stop the stud 53 when turned to a certain position.

The contact wheel 41 has teeth 54 which serve to actuate the contact arm 55 and make contact with the arm 56. The contact arms 55 and 56 are connected by wires to the terminals 57 and 58 respectively. These terminals are preferably spring leaves as shown in Fig. 5, adapted to press against the terminals 59 when the sending device is fastened in position on the cabinet 60.

An indicating arm 61 is pivoted on a pin 62 which projects through, and is fastened to, the cover 63. One end of the indicating arm is bent as at 64 so as to project through the slot 65 in the cover plate. Studs 66 on the cover plate are adapted to limit the travel of the indicating arm 61. A shoulder 67 on one side of the indicating arm is so positioned as to stop the stud 53 when the arm is in one position and another shoulder 68 is positioned to stop the stud in another position of the indicating arm. A groove 69 is cut out of the rear side of the indicating arm and is so shaped as to allow the stud 53 to pass under the arm when the latter is in the vertical or neutral position. A spring 70 engages the indicating arm at 71 and holds it in any one of three positions.

On the cover plate there are engraved or stamped the numerals corresponding to the particular local station which the sending device operates. The numeral "8" at 72 in Fig. 3 represents the number of impulses to actuate the telephone signal and the numeral "9" at 73ª represents the number of impulses to actuate both the telephone signal and the train stop mechanism.

A modification of the calling key is shown in Figs. 27 to 30. This differs from the key just described in having the spring 35 of large capacity so that one winding of the spring will serve for a large number of operations of the calling key. It also differs in having the indicating arm 61 formed with a projection 74 which has a shoulder 75 adapted to stop the stud 53 in the same position as by the flange 52 shown in Fig. 1.

The selector is shown in Figs. 6 to 16 inclusive. On the base 80 are mounted the electro-magnets 81 and the framework 82. An armature 83 is fastened by spring 84 to one end of the magnet and serves to oscillate the lever 85 about the fulcrum 86. The armature 83 is held away from the magnet by the spring 87, adjustable at 88.

The framework 82 supports a shaft 89 on which are keyed the step-by-step ratchet wheel 90, the answer-back wheel 91, and the pinion 92. A coiled spring 93 is fastened at one end to the shaft 89 and at the other to a pin 94. A contact wheel 95, loosely mounted on the shaft 89, carries a projecting arm or stud 96, which runs in a slot 97 in the ratchet wheel 90. This stud 96 is fastened by a coiled spring 98 to the shaft 89 and is normally pressed in a counter-clockwise direction with respect to said shaft, as shown in Figs. 11 and 8.

The ratchet wheel is actuated by the pawl 99, engaging the tooth 102; the pawl 99 is pivoted to the shaft 115 and held against the shoulder 101 on one of the levers 85 by the spring 100. The overthrow of the ratchet wheel is prevented by the rod 114 against which the pawl presses at the proper limit of its motion. The contact wheel 95 is provided with shallow grooves or depressions 103 equally spaced about the greater portion of the its periphery, as shown in Figs. 12 and 13. One of these grooves 104, deeper than the others, extends from one side to the other of the contact wheel; another groove 105 is deeper than the others at one side of the wheel. The contact arm 106 fastened at one end to the framework carries at the other end a detent 107, which is adapted to be pressed from above into one of the grooves, and when sufficiently depressed, to make contact with the corresponding arm 108. Contact arms 106' and 108' (see Fig. 17) are actuated in the same way as contact arms 106 and 108 to allow current to pass through the alarm circuit. The arm 110, pivoted to the framework, is T-shaped at one end as at 111. The end 111 is adapted to press down on the extension 109 and to be pressed upward against the gravity wheel or disk 140. The arm 110 is normally suspended by the spring 112, which may be adjusted at 113. A link 117, pivoted at its lower end at 116 to the lever 85 and its upper end to the crank 118, serves to oscillate the shaft 119. An arm 120 is rigidly fixed to the shaft 119 and is joined at its free end to the arm 121, having a slot 122 in which the axle 123 of a gravity wheel 124 is free to move. A run way 125 for the gravity wheel 124 is fastened to the framework and has pivoted thereon at 127 an oscillating run way 126. An arm 128, keyed to the shaft 132, is connected by the link 129 to the run way 126. A jointed pawl 133 adapted to successively engage the teeth 102 of the ratchet wheel is fastened by a set screw 136 to the shaft 132; the end of the pawl 133 is connected by a jack knife joint at 134 to the part which is fastened to the shaft 132 and is pressed by the spring 135.

From these connections it will be seen that when the gravity wheel is at the lower end of the run way 126, the pawl will be moved out of engagement with the ratchet wheel 90, but when the gravity wheel is pulled up the run way by the motion of the rod 121, the spring 130 will raise the arm 128 and cause the pawl to engage the teeth of the ratchet wheel.

On the shaft 115, which passes through the levers 85, are pivoted the links 137 which are connected at their upper ends to the arm 110 by a pin 138 which has a limited movement in the slot 139. A gravity disk 140 has teeth which engage the threads of a screw 141. The screw 141 is loosely mounted at its upper end in the framework and at its lower end in the extension 142, and the threads thereof have a steep pitch so that a vertical movement of the disk 140 will readily cause a rotation of the screw 141. The screw 141 carries at its upper end two spring-pressed pawls 143, which allow it to rotate in one direction only by engaging the teeth 144 of an interior ratchet wheel 145. A vertical movement of the arm 110 will raise the gravity disk 140 by a movement which is unimpeded by the screw 141 in view of the fact that the latter is free to turn; the disk 140 is for the most part held against any rotary movement by the friction on the end 111 of the arm 110, but when the arm 110 is lowered in order for the disk 140 to come downward, it must revolve about the screw 141 since the latter is prevented from turning by the pawl and ratchet. This time element is preferably adjusted so as to have a somewhat shorter period than the gravity wheel 124.

The means for giving a selective answer-back signal is comprised in a contact wheel 91 having teeth 146 which cause the contact arm 147 to make a contact with the arm 148 when this wheel is rotated in either direction. The answer back wheel 91 is provided with a slot 91$^a$ which engages a stationary pin 91$^b$, the extent of the rotation of the wheel 91 and the shaft 89 to which it is keyed being thereby limited by the stationary pin. A retarding device is shown at 149 in the form of a rotating paddle which is caused to rotate by the pinion 92 in mesh with the pinion 150, which latter is rigidly attached to the paddle; the wheel 92 moves in unison with the ratchet wheel 90 and the contact wheel 91.

The contact wheel 95 may be constructed in various ways without departing from my invention. One such embodiment is shown in Figs. 14, 15 and 16. In this construction the deep grooves 104 and 105 are adjustable about the periphery of the wheel so that the same wheel may be used for any station upon suitable adjustment. In this modification a core 151 has mounted thereon a cylindrical shell 152 provided with a slot 153 allowing circumferential movement of the shell with respect to the screw 154. At each end of the core are annular members 155 having on their inner sides teeth which extend over the shell 152 and provide shallow depressions 157, one of which coincides with the aperture 158 in the shell. The shell is also provided with holes 159 which permit of the insertion of a rod or pin for adjusting the position of the shell 152. The annular members 155 are held in place by screws 156 which extend into the core; the core itself being held in place on the shaft 89 by collars 160 at each end of the core.

Contact arm 108 is connected by a wire 161 to a terminal 162, and one end of coil 81 leads to another terminal 163.

My invention is not limited to the selector above described, but in its broader aspect includes in combination any type of selector which can function in a plurality of ways depending upon the kind of impulses which are used to operate it.

The train equipment for setting the brakes and shutting off the motive power is shown in Figs. 18 to 24 inclusive. The arrangement of the various valves is shown somewhat diagrammatically in Fig. 18. The ordinary engineers' brake valve is used with practically no modification except that in the pipe leading to the gage showing main reservoir pressure, there is inserted a small emergency or auxiliary by-pass valve E. To the frame of the car 168 is attached the equalizing reservoir 169 connected by the pipe 167 to the brake valve B. A release valve R is connected by pipes 170 and 171 and check valve 172 to the pipe 167 just before the latter enters the equalizing reservoir; another pipe 173 connects the release valve through the whistle 174 to the atmosphere. A pipe 175 leads from the top chamber of the application valve A to the pipe 170. The lower chamber of the application valve A is adapted to allow the passage of air at certain times from the brake pipe 176 through pipes 177 and 178 to a main reservoir valve M and through pipe 179 to the cylinder 180 of the throttle closing mechanism. A pipe 181 connected to the main reservoir side of the valve M forms a by-pass around said valve to the emergency or auxiliary by-pass valve E to serve as a passage for air under main reservoir pressure to the pipe 183 when the emergency valve E is operated. The occasional operation of the valve E is for the purpose of accelerating the opening of the valve M and hastening the return of the train stop apparatus to release position and the air brakes to their normal non-operating condition.

The release valve is shown in detail in Fig. 19. A chamber 184 is divided into two compartments by a diaphragm 185 to which is fastened the valve 186. Partly surrounding the upper compartment is a solenoid 187 into which the core 186$^a$ partly extends; this core is connected by a universal joint at 188 to the valve. The upper compartment is connected by an opening 189 to the outlet passage 191, and the lower compartment is connected to the same passage by a much more restricted opening 190. A packing 192 is provided to prevent any leakage of air at this point. A plug 193 is provided at the bottom of the valve to permit of the adjustment of the valve seat. The solenoid is protected and held in place by the cover 194 which is secured to the body of the valve by the bolts 195. The ends of the solenoid winding lead to the binding posts 196. The application valve A, shown in detail in Fig. 20, has a valve 197 provided with a piston or guide 198 and fastened to the diaphragm 199 by collars 201. This valve is normally pressed on its seat by the spring 200.

The main reservoir valve M shown in Fig. 21 is provided with a chamber 202 in which moves the piston 203 normally pressed upward by the spring 204. The valve stem is fastened at one end to the piston and has at the other end a valve head 205 having two faces 206 and 208. In its lower position the face 206 contacts with the seat 207 and prevents the passage of air from the main reservoir to the brake valve; in its upper position the face 208 fits snugly in the upper seat and prevents any leakage of air around the valve. The valve stem, just above the face 208, is provided with a very small groove which connects with the passage 209 so that when the valve is in its lower position there is a small leakage of air into the upper chamber below the piston 203. The chamber 210 is connected at 211 to the main reservoir pipe and at 212 to the pipe leading to the brake valve, the passage from the main reservoir to the brake valve being unimpeded during normal operation of the train.

The emergency valve or by-pass, Figs. 22—24, has a rotary valve head 213 provided with an opening 214 which can be made to register with the opening 223. A handle 216 is secured to the upper end of the valve stem 215 and is normally held in its inoperative position by the spring 217 holding it against the projection 218. The chamber above the valve head is connected by the pipe 219 to the duplex pressure gage 220, to another part of this gage being also connected by a pipe 221 to the equalizing reservoir; the pressure in the latter under normal running conditions is about 20 pounds less than that in the main reservoir. The valve head 213 is normally pressed against its seat by the spring 222.

The mechanism for closing the throttle, shown in detail in Fig. 18, consists of a cylinder 180 pivoted on the extension 224. The stem 226 of the piston 225 is pivoted to one corner 227 of the harp 228, another corner of which is pivoted in the quadrant 229. The third corner of the harp is linked to the bell crank 230 by the rod 231. The crank 230 is pivoted on a pin 232 which projects from the throttle lever 233 through the slot 234 in the quadrant latch 236. One end of the bell crank 230 is adapted to press against the stud 235 and move the quadrant latch 236 out of engagement with the quadrant, whereupon the continued turning of the harp 228 causes the throttle lever 233 to close the throttle valve 237. The train circuit also shown in Fig. 18 starts at the ramp rail 238, passes through the contact device 239 and brush 240, and through the wire 241 to the binding post 196 of the solenoid, and from the other binding post through the wire 242 and brush 243 to the axle 244 and thence to the rail 245.

The various circuits employed, shown diagrammatically in Fig. 17, comprise a local circuit at the despatcher's office having a battery 246 which supplies current for the sending device represented by the contact wheel 41. The closing of this circuit, which includes an electro-magnet 247, when the calling key is operated actuates the contacts 248 and closes the main line circuit having a source of current 249. The line wires 250, 251 have the usual choke coils 252 and condensers 253. Telephone receivers 254—254' bridge the line at the despatcher's station and at the several local stations. The electro-magnets 81 bridge the line at each local station. The local signal circuit is shown with a battery 255 which leads through the wire 256 to the contact arm 108' and thence to 106', which is actuated when the contact wheel is in the proper position, then to the contact arm 147 of the answer-back mechanism to the arm 148 through the wire 257 to the coil 258 on the electro-magnet 81, and from there through the signal 260 to the battery. The coil 258 is connected at 259 to the main line coil in order to lessen the static effect.

The train stop circuit has a battery or other source of current 261 which leads through the connection 262 through contact arms 108 and 106 through wire 263 to the rail 245, and then through the train circuit to the ramp rail back to the battery. An emergency switch 264 is placed across the line so that the train stop mechanism may be actuated if necessary from the local station independently of the selector. The diagram also shows a semaphore 265 adapted to close the circuit when in its danger position through wires 266 and 267 in bridge of said circuit. An emergency key 268 bridges the line at the sending station so that by a single depression of this key any selector contact wheel which is in an advanced position will be returned to its initial position.

In some cases it may be desirable to dispense entirely with the selector and have the train stop circuit closed solely by the movement of the semaphore 265 into its danger position. The connections for this are shown in Fig. 26 wherein the ramp rail 238 is connected directly to the battery through wires 266' and 267'.

The operation of the system will now be described. When the sending device at the despatcher's station is not operating, the indicating arm 61 thereof is in the neutral vertical position and the flange 52 is in contact with the pin 53 on the contact wheel. In the modified form of sending device the pin 53 will be held by the shoulder of the arm 74. When the despatcher desires to call a particular station in order merely to communicate therewith, he moves the indicating arm to the right as shown in Fig. 3 to the telephone position; the handle 39 is then turned to the limit of its motion and released; in so doing the handle moving flange 52 winds the spring 35 and releases the stud 53. When the handle 39 is released the spring will cause the contact wheel to rotate and the teeth thereof will actuate the contact arm 55 a number of times corresponding to the number of teeth on the wheel. When the indicating arm has been placed in the telephone position, the shoulder 67 will stop the stud 53, and consequently the contact wheel, at such a point that the detent of the contact arm 55 will be between the ultimate and penultimate teeth 54$^a$ and 54$^b$. The actuation of the contact arm 55 will result in setting up of a series of current impulses over the line wires which will rapidly energize the electro-magnet 81 and cause the ratchet wheel 90 and the contact wheel 95 of the selector mechanism to be progressed to a predetermined position. When the signal has been answered by the local station agent, the indicating arm is moved back to its neutral position. This movement brings the slot 69 in line with the stud 53 and allows the latter to pass under the indicating arm to its starting position where it is held by the flange 52. While the contact wheel passes from its end position to its starting position, both the tooth 54$^a$ and the tooth 73, which is somewhat extended, will cause the arm 55 to make a contact. The two contacts thus made will have a pause of considerable length between them so that the selector will be actuated to release its contact wheel without the ratchet wheel being stepped up, as will be more fully described hereinafter. The contact wheel of the calling key is given a slow uniform motion by means of the usual escapement mechanism.

When the despatcher desires to set the train stop circuit as well as to get in telephonic communication with the local station agent, he moves the indicating arm to the left or train stop position. When the spring is wound and the contact wheel rotated, it will be stopped in this case by the shoulder 68 which is in such a position as to allow all of the teeth to pass under and actuate the contact arm 55. The number of impulses sent to the selector in this case is, therefore, one more than is sent when the indicating arm is in the telephone position, and the contact wheel is progressed one position further than when the telephone signal alone is given. When the indicating arm is moved back to its released position, the contact wheel is allowed to travel back to its starting position as above described, sending a single releasing impulse over the wires to the selectors.

Figure 27:
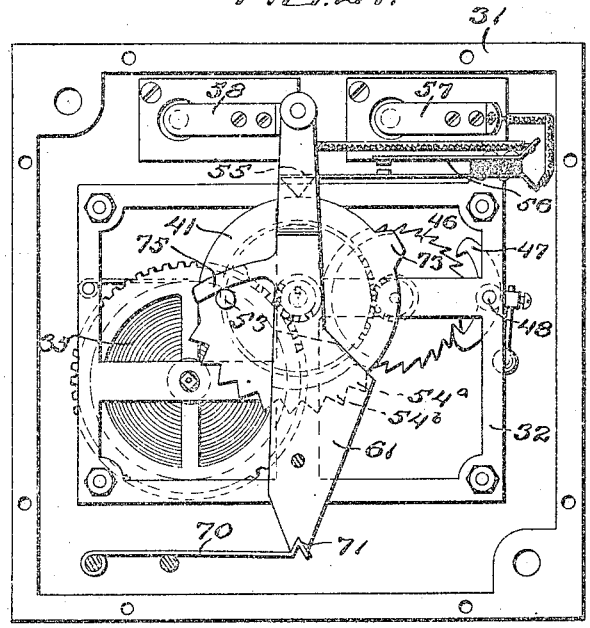
Fig. 27 is a front elevation of a modified form of calling or sending key with cover removed.
Figure 30:
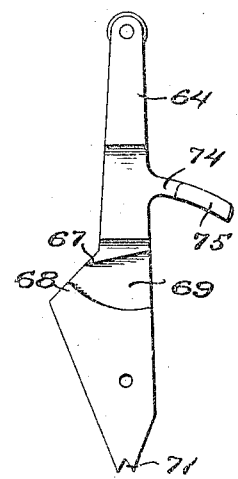
Fig. 30 is a rear elevation of the modified form of indicating arm.
Figure 28:
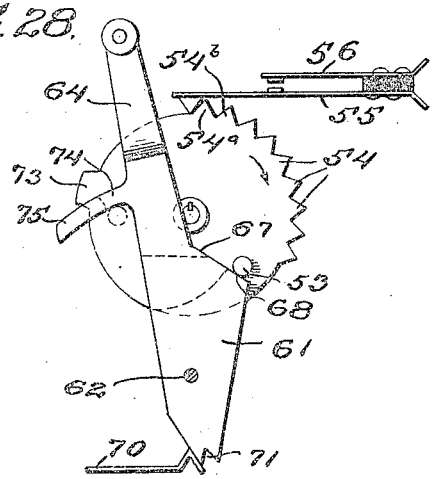
Fig. 28 is a front elevation of the indicating arm and contact wheel after the calling key has been operated.
Figure 29:
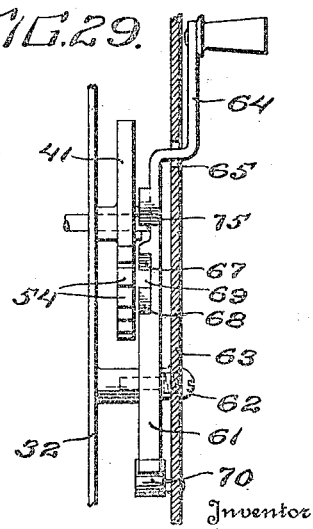
Fig. 29 is a side elevation of part of the modified calling key showing the indicating arm in neutral position and the cover in place.

When the modification shown in Fig. 27 is used, one winding of the spring 35 will be sufficient to operate the calling key a large number of times. In this case when the local station is to be called it is only necessary to move the indicating arm to the telephone or train stop position.

When the electro-magnet of the selector is energized it attracts the armature 83 and moves the lever 85 about its fulcrum, causing the arm 99 to turn step-by-step the contact wheel 90 to a position determined by the number of energizations, quickly succeeding each other, of the electro-magnet. The ratchet wheel engaging the pin 96, which projects from the contact wheel 95, causes the contact wheel to move in unison with it. The movement of the lever 85 at the same time through the arms 117, 118, 120 and 121 causes the gravity wheel 124 to be pulled up its run way onto that part of the run way indicated at 125 and allow the pawl 133 to hold the ratchet wheel at each advanced position thereof. The movement of the lever 85 also serves to raise the time element 140 through the motion of the member 137, which raises the arm 110. The several energizations of the magnet succeed each other so quickly that the time elements 124 and 140 do not have time to come to their resting position; the spring contact arms 106 and 106' are consequently permitted to hold the detents out of the depressions or grooves in the contact wheel 65 while the latter is being moved around to its predetermined position. As soon as a pause occurs, the time element 124 moves down on the run way 126 which turns on its pivot 127 and raises the pawl 133 out of engagement with the ratchet wheel 90, permitting the spring 93 to return the ratchet wheel to its starting position. Before the gravity wheel 124 has effected this release of the ratchet wheel, however, the time element 140 has moved down and has pressed the detent 107 on the contact arm 106 into one of the grooves on the contact wheel. When the ratchet wheel is turned back into its starting position, the contact wheel is held in its advanced position; this motion of the ratchet wheel with respect to the contact wheel serves to place the spring 98, which connects the two wheels, under an increased tension. All the selectors along the line will be moved up to the same extent but only one selector will have a deep groove 104 or 105 under the detent in any given advanced position. In that selector which is to be operated, therefore, the contact arm 106 will be pressed down to such an extent that it will make a contact with its corresponding arm 108, whereas in those selectors which are not to be operated, the shallow grooves in the contact wheel will allow the detent to be moved down only a small distance sufficient to hold the contact wheel in its advanced position but insufficient to allow the contact arm 106 to make a contact with the arm 108. When the contact has been made in the particular selector, it is maintained until a positive release impulse has been sent through the line wires. To release the contact wheel, a single positive impulse, initiated at the despatcher's station, either by putting the indicating arm in released position or by actuating the emergency switch, is sent over the wires and the resulting energization of the electro-magnets effects the raising of the time element 140 and allows the contact arm 106 to raise itself out of the groove 104 and permits the spring 98, pressing on the pin 96, to return the contact wheel to its starting position.

This single energization momentarily moves the ratchet wheel one step forward so that the contact wheel when it returns as far as the pin 96 will allow, will be advanced one step in order to prevent the contact wheel being held in this position by the detent 107, that portion of the cylindrical surface of the contact wheel corresponding to the first step forward is made without a groove. After this single actuation of the several parts and after the pawl 133 has been raised to allow the ratchet wheel to return from its first position to its starting position, the contact wheel will consequently move back with it. It will, therefore, be apparent that a single impulse sent over the line wires will in all cases serve only to release any selector that has been stepped up without otherwise affecting the various selectors.

The contact wheel is provided with a deep groove which extends clear across the periphery and with a second deep groove which extends only part way across the periphery and adjacent to the first groove, so that in one position of the contact wheel both contact arms 106 and 106' will be pressed down sufficiently to make contacts, this being the train stop position, whereas in the other advanced position only the contact arm 106' can be sufficiently depressed to make a contact with its corresponding arm 108'.

The local signal circuit passes through contact arms 147 and 148 as well as through arms 106' and 108'. As soon as the circuit is closed by the contact arm 106' being sufficiently depressed, the current rings the bell 260 which, by making and breaking the circuit, induces a return current in the electromagnet 81 and the line wires. When the ratchet wheel 90 returns, the answer-back contact 91 which moves in unison with the wheel 90, slowly makes and breaks the local signal circuit, thereby effecting a series of audible signals in the line wires and a pause between each one sufficient to enable the despatcher to determine whether or not the number of separate audible signals corresponds to the station being called. It will be seen that the answer-back mechanism has no effect on the local signal circuit until after contact arm 106' has been pressed down into one of the deep grooves so as to make a contact.

The local circuit which operates the solenoid on the release valve at the train may be closed directly by the selector through the movement of the contact arms 106 and 108 or, when the current necessary to operate the solenoid is very strong, these contact arms may simply close a small secondary circuit which in turn will close the main local train stop circuit.

The operation of the release valves on the train when current passes through the solenoid 187 is as follows: The current passing through the solenoid 187 raises the core 185ᵃ and the valve 186 from its seat, allowing air from the equalizing reservoir and from the upper and lower compartments of the valve R to escape through the passage 191 and pipe 173 to the atmosphere. The valve 186 will remain in the raised position for a short time even after current has ceased to pass through the solenoid, since the air escapes faster from the upper compartment through the large opening 189 than it does from the lower compartment through the restricted opening 190, the excess pressure in the lower compartment pressing the diaphragm 185 upward.

While current is passing through the solenoid the valve is held wide open, permitting a sudden reduction of pressure sufficient to cause a quick service movement of the triple valves of the train; as soon as the contact shoe 239 has passed over the ramp rail and current ceases to flow through the solenoid, the weight of the plunger 186ᵃ forces the valve toward its seat, but is unable to immediately seat the valve due to the pressure in the lower compartment 184 being greater than that in the upper compartment. This difference of pressure is sufficient to hold up the valve for a short time, furnishing thereby a restricted opening for the slow escape of air. The ports 189 and 190 are so proportioned that the air pressures will be sufficiently equalized to allow the valve to close when the pressure in the brake-pipe has been reduced by an amount corresponding to a full service application, i. e. by about 20 pounds.

The reduction of pressure in the equalizing reservoir will have the same effect in the application of the brakes as though this reduction had been made by a movement of the handle on the brake valve from a running position to a service application position. When the release valve is operated the reduction of pressure in the pipe 170 will also cause a reduction in pressure in the pipe 175 and in the upper compartment of the application valve A, allowing the valve 197 to become unseated by the pressure in the lower compartment, which in turn allows the air from the brake pipe 176 to pass through pipes 177 and 178 to the main reservoir valve M, and through pipe 179 to the throttle closing cylinder 180.

The access of air under pressure to the valve M causes the piston 203 of this valve to seat the valve 205 and thus prevent air from the main reservoir from passing through to the brake valve. This insures that the operation of the brake valve by the engineer will have no effect on the stopping of the train. Ordinarily the valve 205 will remain down only a short time since air under brake pipe pressure will gradually pass up through the opening 209 into chamber 202 and raise piston 203. When the piston has been raised to its highest position an opening 202ᵃ to the atmosphere is exposed; the continued escape of air through the passage 209 is prevented by the face 208 of the valve coming in contact with the upper seat. Should the valve 205 become fouled and stick to the seat 207, it may be unseated by turning the emergency lever 216 so as to allow air from the main reservoir to enter pipe 182 and pass up through passage 209 and raise the piston 203. Even if this should fail to raise the valve 205 off its seat the by-pass will be sufficient to allow the brake valve to be operated.

At the same time that the valve M is operated, the air from the brake pipe flows into the cylinder 180 and by moving the piston 225, effects the release of the quadrant latch and then the closing of the throttle. A small hole is usually provided in the top of the cylinder 180 so that in normal operation of the train the engineer may move the lever 233 with very little resistance being offered to the movement of the piston 225; this hole, however, is so small as to have no appreciable effect on the operation of the piston when air under brake pipe pressure is admitted to the cylinder.

With a construction of the character just described the train is stopped by a full service application of the brakes rather than by an emergency application.

I claim:

1. A selective automatic train-stop system comprising a line of railroad, a plurality of way stations along said road connected by line wires to a sending station, a selector at each of said way stations, a signal actuated by the selector when the latter is moved to one position, and means on a moving railway vehicle, actuated by the selector when the latter is moved to another position, for stopping said vehicle, substantially as described.

2. In a train stop mechanism a train equipment comprising an automatic air-brake system including an equalizing reservoir, a brake-pipe, a throttle-closing device actuated by air pressure, a valve normally held closed by air under pressure to prevent access of air under pressure to said throttle-closing device, and a releasing means for simultaneously reducing the pressure in the equalizing reservoir and the pressure on said valve to open the latter and provide a passage for air under pressure from the brake-pipe to said throttle closing device.

3. A selective automatic train stop system comprising a line of railroad, a plurality of way stations along said road connected to a sending station by line wires, a local circuit at each of said way stations having two breaks therein, a selector in bridge of said line wires at each of said way stations, any one of said selectors being operable by one set of current impulses from the sending station to actuate a telephone signal and by another set of current impulses both to actuate a telephone signal and to close one of the breaks in the local circuit, a railway vehicle provided with an air-brake system on the line of road, and means on said vehicle for closing another of the breaks in said circuit and for actuating the air-brakes when current passes through part of said last mentioned means, substantially as described.

4. In a system for stopping trains, the combination with a train equipment comprising an automatic air-brake system including an engineer's brake-valve directly connected with an equalizing-reservoir, of a release valve, for said equalizing-reservoir, operating to release air from the equalizing-reservoir and to automatically discontinue such release before the pressure is reduced to atmospheric pressure, automatic means for preventing an increase in the resulting pressure in said reservoir, and means located at a point along the line of railroad for setting in operation said release-valve.

5. A selective automatic train-stop system comprising a line of railroad, way stations along said road connected to a sending station by line wires, a local circuit at each of said way stations having two breaks therein, a selector operated from said sending station through said line wires for closing one of said breaks, a train equipment comprising a train circuit for closing the other break, an electromagnet in said train circuit, an air-brake system including an engineer's brake-valve directly connected with an equalizing-reservoir, a release valve operable by said electromagnet for releasing part only of the air from the equalizing-reservoir, and automatic means for preventing an increase in the resulting pressure in said reservoir, substantially as described.

6. In a system for stopping trains the combination with a local circuit on a line of railroad having a break therein, of a train equipment comprising a train circuit for closing said break, an electro-magnet in said train circuit, an air-brake system including an engineer's brake valve directly connected with an equalizing-reservoir, a release valve operable by said electro-magnet for releasing part only of the air from the equalizing-reservoir, and automatic means for preventing an increase in the resulting pressure in said reservoir, substantially as described.

7. In a selective automatic train-stop system along a line of railroad the combination with a local circuit having two breaks one of which is adapted to be closed by a selector controlled from a sending station, of a train equipment comprising a train circuit for closing the other of said breaks, an electromagnet in said train circuit, an air-brake system including an engineer's brake-valve directly connected with an equalizing-reservoir, a release valve operable by said electromagnet for releasing part of the air from the equalizing-reservoir, and automatic means for preventing an increase in the resulting pressure in said reservoir, substantially as described.

8. In a system for stopping trains the combination with a local circuit on a line of railroad having a break therein, of a train equipment comprising a train circuit for closing said break, an electromagnet in said train circuit, an air-brake system including an engineer's brake valve directly connected with an equalizing reservoir, a release valve operable by said electromagnet independently of said brake valve for releasing part only of the air from the equalizing-reservoir, and automatic means for preventing an increase in the resulting pressure in said reservoir, substantially as described.

9. In a system for stopping trains, the combination with a train equipment comprising an automatic air-brake system of a release valve for reducing brake pipe pressure adapted when operated to furnish an opening of a given size for a brief period, then to furnish a smaller opening for another short period and then to close, and means outside of said train for setting said release valve in operation.

10. In a system for stopping trains, the combination with a train equipment comprising an automatic air-brake system of a release valve for reducing brake pipe pressure adapted when operated to furnish an opening of a given size for a brief period, then to furnish a smaller opening for another short period and then to close when the pressure has been reduced by about 20 pounds, and means outside of said train for setting said release valve in operation.

11. In a system for stopping trains the combination with a local circuit on a line of railroad having a break therein, of a train equipment comprising a train circuit for closing said break, an electromagnet in said train circuit, an engineer's throttle for controlling the motive power, an air-brake system including an engineer's brake valve and an equalizing reservoir, and a release valve operable by said electromagnet independently of said brake valve for releasing air from the equalizing reservoir and for actuating a means for moving the throttle so as to shut off the motive power, substantially as described.

12. In a train stop mechanism the combination with an automatic air-brake system including a main reservoir, an engineer's brake-valve directly connected with an equalizing-reservoir, and a brake-pipe, of means independent of operation of the brake-valve handle for releasing air from said equalizing-reservoir, and means entirely independent of operation of the brake-valve handle for preventing main reservoir air from entering the brake-pipe when said first mentioned means is operated.

13. In a train stop mechanism the combination with an automatic air-brake system including a main reservoir, an engineer's brake-valve, and a brake-pipe, of a release valve opening independently of the brake-valve for releasing air from the brake-pipe and automatically closing before the pressure is reduced to atmospheric, and another valve, also operable independently of said brake-valve, for preventing main reservoir air from being fed into the brake-pipe through the brake-valve when said release valve is operated.

14. In a train stop mechanism the combination with an automatic air-brake system including a main reservoir, an equalizing reservoir, an engineer's brake valve and a brake pipe, of a release valve for releasing air directly from the equalizing-reservoir, and another valve unaffected by operation of the brake-valve handle for preventing main reservoir air from being fed into the brake-pipe when said release valve is operated.

15. In a train stop mechanism the combination with an automatic air-brake system including a main reservoir, an engineer's brake-valve directly connected with an equalizing-reservoir, and a brake-pipe, of electrically operable means independent of operation of the brake-valve handle for partially reducing the pressure in the equalizing-reservoir, and means entirely independent of the brake-valve for preventing main reservoir air from entering the brake-pipe when said first mentioned means is operated.

16. In a train stop mechanism the combination with an automatic air-brake system including a main reservoir, an engineer's brake-valve, and a brake pipe, of means independent of operation of the brake-valve handle for releasing a portion only of air from the brake-pipe and adapted, when operated, to make first a sudden reduction of pressure in the brake-pipe and then a further slow reduction, and means also independent of the brake-valve for preventing main reservoir air from entering the brake-pipe when said first mentioned means is operated.

17. In a train stop mechanism the combination with an automatic air-brake system including a main reservoir, an equalizing reservoir, an engineer's brake valve and a brake pipe, of a release valve for releasing air from the equalizing reservoir, a main reservoir valve for stopping the supply of air from the main reservoir to the brake valve, and a valve operated by the release valve for admitting brake pipe air to the main reservoir valve to close the same, substantially as described.

18. In a train stop mechanism the combination with an automatic air-brake system including a main reservoir, an equalizing reservoir, an engineer's brake valve and a brake pipe, of a train circuit including an electromagnet, a release valve operable by said electromagnet for releasing air from the equalizing reservoir, a main reservoir valve for stopping the supply of air from the main reservoir to the brake valve, and a valve operated by the release valve for admitting brake pipe air to the main reservoir valve to close the same, substantially as described.

19. In a train stop mechanism the combination with an engineer's throttle for controlling the motive power and an automatic air-brake system including a main reservoir, an equalizing reservoir, an engineer's brake valve and a brake pipe, of a train circuit including an electromagnet, a release valve operable by said electromagnet for releasing air from the equalizing reservoir, a main reservoir valve for stopping the supply of air from the main reservoir to the brake valve, means comprising a cylinder with a piston adapted to move the throttle, and a valve operated by the release valve for admitting brake pipe air both to the main reservoir valve to close the same and to said cylinder to move the throttle and shut off the motive power, substantially as described.

20. In a mechanism of the character described the combination with a main reservoir connected by a conduit to the brake-valve of an automatic air-brake system, of a valve device interposed in said conduit comprising a valve adapted to close said conduit when air under brake-pipe pressure is admitted to said device, a by-pass around said device, and an engineer's by-pass valve normally closing said by-pass during ordinary operation of the train, and adapted, when opened, to admit air from the main reservoir to the brake-valve side of said valve device to unseat the valve therein and to permit the air-brake and train stop systems to return to release or running condition, substantially as described.

21. In a train stop mechanism of the character described the combination with a main reservoir connected by a conduit to the brake-valve of an automatic air-brake system, of a valve device interposed in said conduit for closing the latter under certain conditions, a by-pass around said valve device, and an engineer's by-pass valve normally closing said by-pass and adapted, when opened at a time when said valve device is closed, to admit air from the main reservoir to the brake-valve side of said valve device to unseat the valve therein and permit the air-brake and train stop systems to return to release or running condition, substantially as described.

22. In a train stop mechanism a valve adapted under certain conditions to permit the passage therethrough of air from the brake-pipe comprising a metal-walled chamber divided into two compartments by a flexible diaphragm, an inlet and outlet in one of said compartments adapted to communicate with the brake-pipe, the outlet being so shaped as to provide a seat for a valve, a valve fastened to the diaphragm and extending through said chamber into said outlet, a spring in the other compartment normally holding the valve in its seat to close the outlet, said other compartment having an opening adapted to communicate with a source of air under pressure normally sufficient to counterbalance the pressure of the air in the first mentioned compartment, substantially as described.

JAMES R. COKER.